United States Patent [11] 3,570,804

[72] Inventors Norman A. Nelson
Houston;
Jerry B. Tomlin, Houston, Tex.
[21] Appl. No. 817,518
[22] Filed Apr. 18, 1969
[45] Patented Mar. 16, 1971
[73] Assignee ACF Industries, Incorporated
New York, N.Y.

[54] HYDRAULIC VALVE OPERATOR HAVING MANUAL OVERRIDE MECHANISM
2 Claims, 3 Drawing Figs.
[52] U.S. Cl. ................................................. 251/25,
251/63.4, 251/14, 92/63
[51] Int. Cl. ........................................................ F16k 31/143
[50] Field of Search ............................................ 251/63.4,
26, 19, 25, 20, 60, 62, 14; 92/63, 62

[56] References Cited
UNITED STATES PATENTS

| | | | |
|---|---|---|---|
| 2,707,483 | 5/1955 | Shafer .......................... | 251/14x |
| 2,745,626 | 5/1956 | Wilson .......................... | 251/25 |
| 3,155,365 | 11/1964 | Hartung et al. ................ | 251/25 |
| 3,402,912 | 9/1968 | Watkins ........................ | 251/14 |
| 3,446,241 | 5/1969 | Skoli ............................ | 251/60x |

*Primary Examiner*—Arnold Rosenthal
*Attorney*—James L. Jackson

ABSTRACT: A valve operator mechanism for valves having linearly actuated reciprocating gates. The valve operator mechanism includes an operator base portion and an operator closure member which cooperate with hydraulic cylinder to define a hydraulic chamber. A piston is movably disposed within the hydraulic chamber and is connected in unitary assembly with a reciprocating gate by a valve stem extending through the operator base and into the valve chamber. A hydraulic fluid supply is communicated into the operator chamber on one side of the piston for controllable actuation of said piston in one direction. A compression spring member is operable to return the piston to an initial position upon dissipation of the hydraulic fluid pressure above the piston. The valve operator mechanism is provided with mechanically or hydraulically actuatable override means controllable externally of the valve operator and being capable of overriding the spring means and biasing the gate member to any desired position thereof. Upon retraction of the override mechanism, the spring means will bias the piston, stem and gate assembly to another predetermined position.

Norman A. Nelson &
Jerry B. Tomlin
INVENTORS

BY *James Jackson*
ATTORNEY

3,570,804

Norman A. Nelson & Jerry B. Tomlin
INVENTORS

BY *James Jackson*
ATTORNEY

HYDRAULIC VALVE OPERATOR HAVING MANUAL OVERRIDE MECHANISM

BACKGROUND OF THE INVENTION

This invention is generally related to gate valve operators and more particularly concerns hydraulically energized spring return operators which induce controlling linear actuation to the gate member of a gate valve. While the hydraulic actuator structure of this invention is ordinarily capable of controlling positive opening and closing movement of a gate valve, it is frequently necessary to provide an override structure which is capable of imparting controlling movement to the gate member of the valve in the event the hydraulic fluid supply system of the valve operator should be damaged or otherwise rendered inoperative. For example, when the valve to be controlled is an operative part of a wellhead or Christmas tree assembly, it is frequently necessary that there be provided a positive means for opening and closing the valve in order to prevent damage to the wellhead assembly and other related structures in the event of emergency. In the event the hydraulic fluid supply system for the valve operator should become damaged or otherwise rendered inoperative, it will be necessary to provide either manually or remotely controlled means for controlling the valve operator.

Accordingly, it is a primary object of this invention to provide a novel gate valve operator structure including an override system, which is capable of moving the gate member to the open or closed position thereof in the event the hydraulic fluid supply system for controlling the operator should be rendered inoperative or in the event the valve operator should otherwise be rendered inoperative.

It is a further object of this invention to provide a novel hydraulically energized gate valve operator structure, which is capable of retaining the gate member in an intermediate position between its open and closed positions, if desired.

It is an even further object of this invention to provide a novel hydraulically actuated gate valve operator mechanism having an externally adjustable override mechanism providing an adjustable internal stop, which is externally controllable.

Among the several objects of this invention is contemplated the provision of a novel hydraulically energized gate valve operator mechanism, which is capable of being manually actuated through the use of readily available tools in the event emergency operation of the valve operator should become necessary.

It is another important object of this invention to provide a novel hydraulically actuated gate valve operator mechanism including an override structure which is capable of being manually operated from a remote location to achieve emergency opening and closing of the valve with which the operator is associated.

It is an even further object of this invention to provide a novel hydraulically energized gate valve operator mechanism including an operator override device and which is simple in nature, reliable in use and low in cost.

Other and further objects, advantages and features of this invention will become apparent to one skilled in the art upon consideration of the written specification, the attached claims and the annexed drawings. The form of the invention, which will not be described in detail, illustrates the general principals of the invention, but it is to be understood that this detailed description is not be be taken as limiting since the scope of the invention is best defined by the appended claims. Such description will be referred to by reference characters in the drawing in which:

Figure 2:
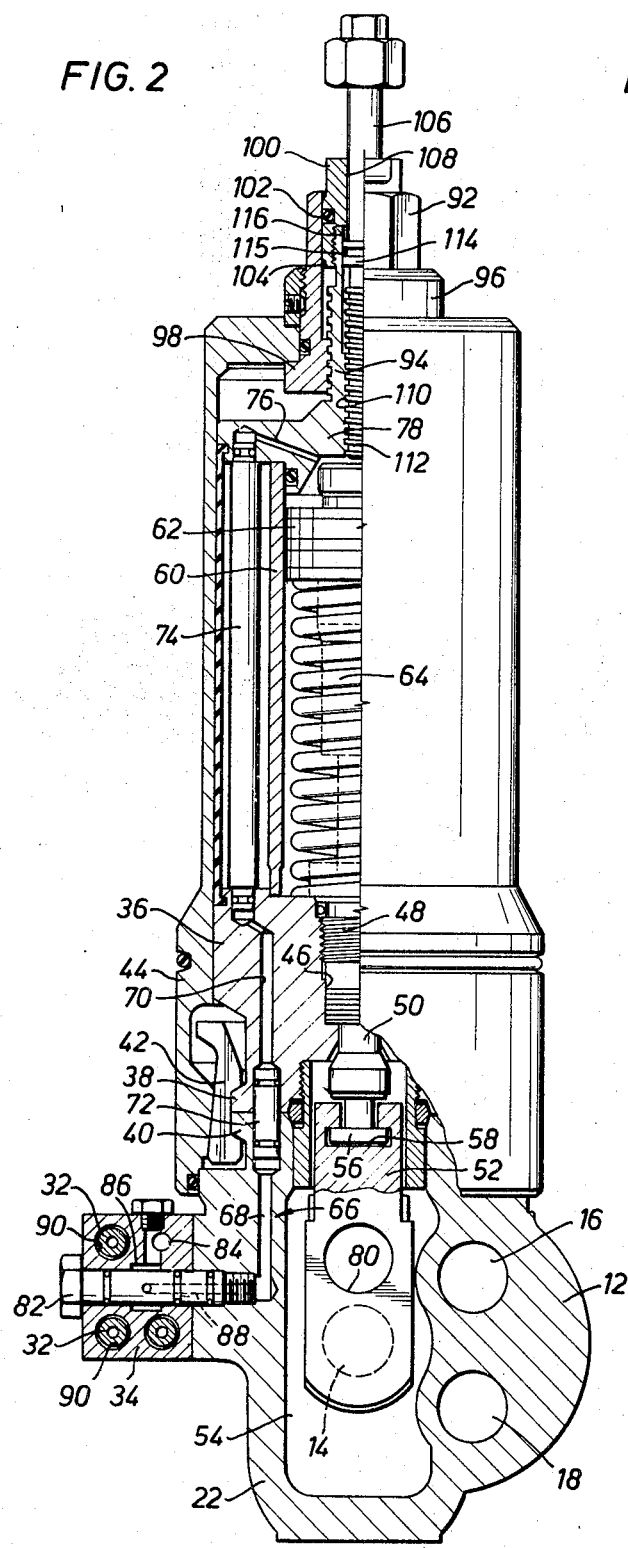
FIG. 2 is a partial sectional view taken through the wellhead valve assembly of FIG. 1 and illustrating the valve operator structure of this invention in detail.
Figure 3:
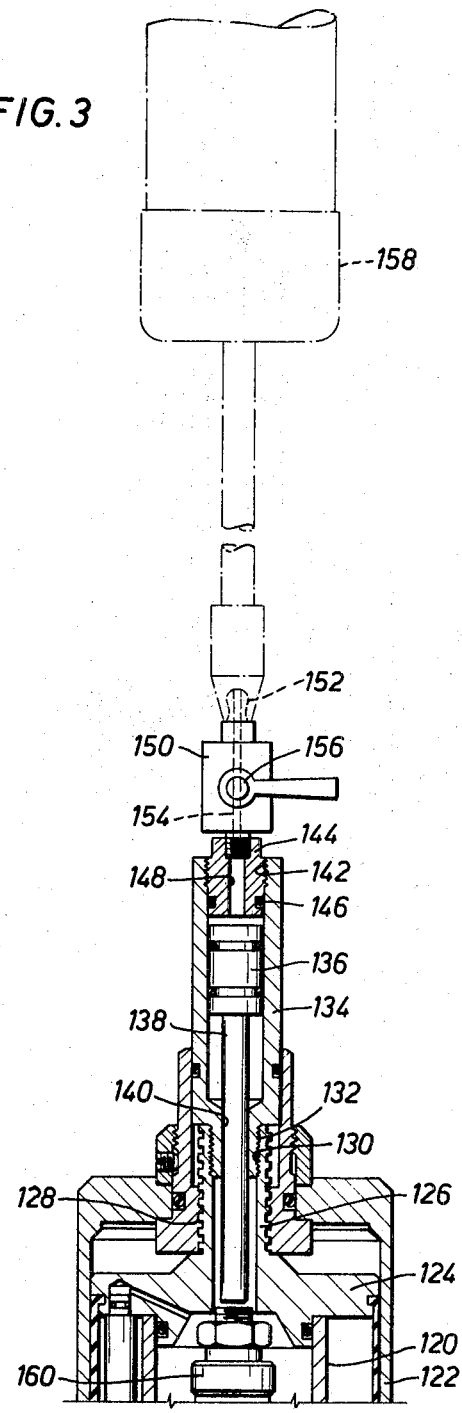
FIG. 3 is a fragmentary section view of a valve operator structure illustrating a modified embodiment of this invention.

Briefly, the invention concerns a piston-type valve operator mechanism, which includes a piston movably disposed within a hydraulic cylinder. The piston is connected to a gate member within the valve and is capable, upon being moved by hydraulic pressure to impart linear movement to the gate member. A spring member is provided to bias the piston member in the opposite direction to provide for return of the piston valve stem and gate structure to an initial position upon exhaust of hydraulic fluid from the valve operator chamber. The valve operator mechanism is provided with a mechanical override device, such as illustrated in FIG. 2, including an override stem which is threadedly received within the closure of the hydraulic cylinder and which, upon being rotated, will move linearly into abutment with the piston and will bias the piston against the return spring, thereby moving the piston stem and gate structure to a preselected position. Upon retraction of the override stem by counterrotation thereof, the piston return spring will force the piston member back to its initial position thereby moving the gate member to its open or closed position as desired. As illustrated in FIG. 3, manual override of the piston operator structure may be achieved by a small hydraulic actuator which is energized by pressurized fluid from a grease gun or the like, to cause an override stem to be moved into abutment with the piston member forcing the same downwardly against the bias of the piston return spring.

Figure 1:
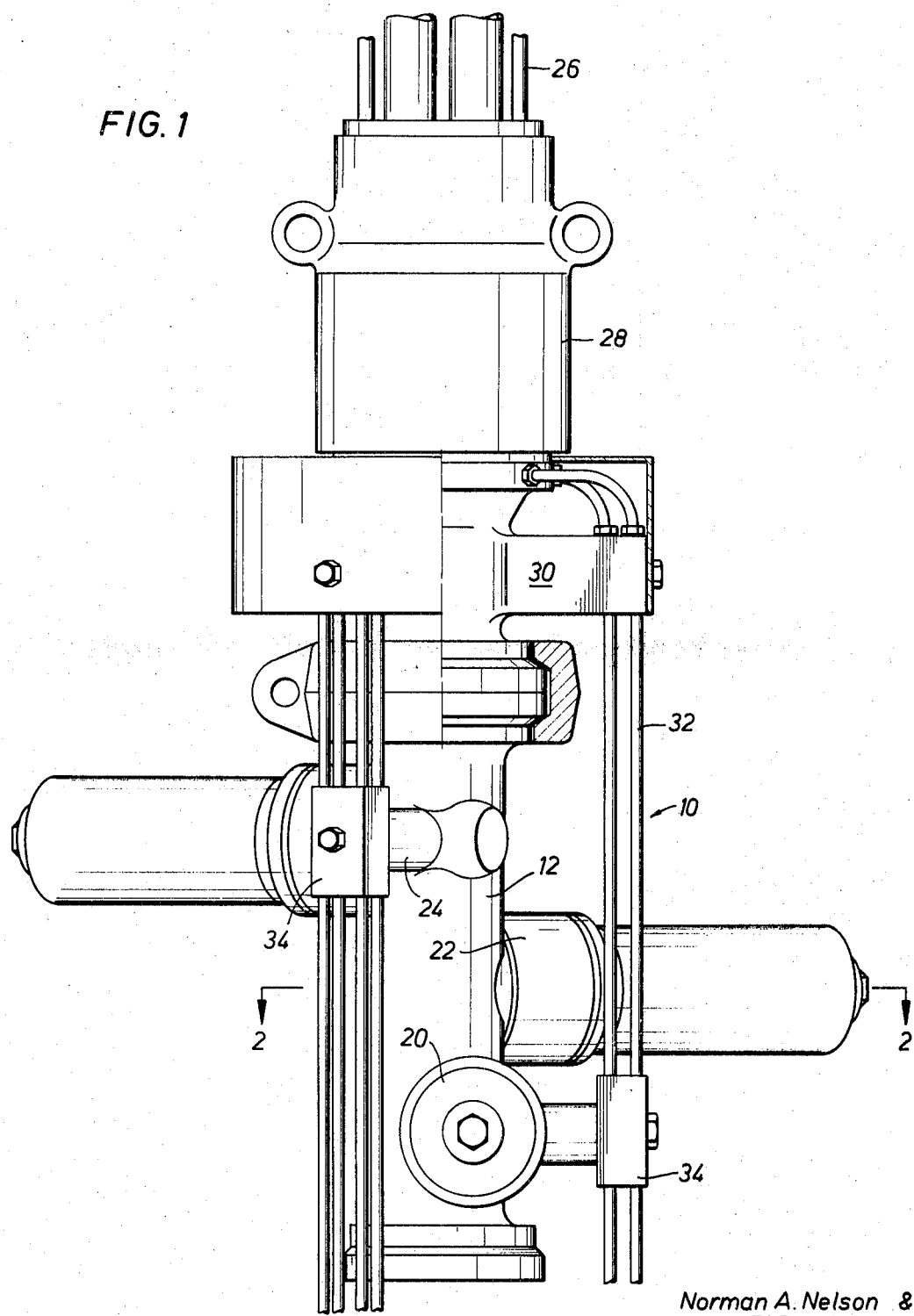
FIG. 1 is an elevational view of a multiple bore wellhead assembly, including a plurality of valves, each being provided with a valve operator mechanism constructed in accordance with the present invention.

Referring now to the drawings for a is detailed description of the invention in FIG. 1 is illustrated the top section of a wellhead valve assembly 10, which comprises a wellhead valve body 12 having three flow passages 14, 16 and 18 best illustrated in FIG. 2. The wellhead valve body 12 is provided with valves 20, 22, and 24, each being associated with one of the flow passages 14, 16 and 18 to control the flow of production fluid produced through the wellhead. Each of the valves is provided with a valve operator mechanism, which is hydraulically actuated to induce controlling movement to the valve with which it is associated.

Hydraulic fluid for controlling movement of each of the valve operators is supplied through fluid supply conduits 26 communicating through a connector mechanism 28 and a fluid supply spool 30 to hydraulic fluid distribution conduits 32. The hydraulic fluid distribution conduits 32 communicate pressurized hydraulic fluid through a fluid supply module 34 and into the hydraulic fluid supply system of the associated valve operator. The particular construction of the wellhead and hydraulic fluid supply system, illustrated in FIG. 1 is not to be considered as limiting the scope of this invention, since it is obvious that this invention may be utilized with valves and valve operators of other design and construction without departing from the spirit and scope hereof.

As illustrated in FIG. 2, the valve operator section of the valve and operator assembly includes an operator body 36 having a lower connection flange 38 which is adapted for abutting sealed engagement with an upper connector flange 40 formed on the valve body 12. A plurality of segment clamps 42 are disposed about the flanges 38 and 40 and are movable between latched and unlatched positions thereof by the internal cam surfaces formed on a shroud member 44 for the purpose of releasably connecting the connector flanges 38 and 40 into abutting sealed assembly. The shroud member 44 is movable linearly relative to the operator body structure to achieve latching and unlatching of the segment clamps 42.

The operator body 36 is provided with a central passage 46 having internal threads which threadedly receive a packing assembly 48. The packing assembly establishes a fluidtight seal between the operator body and valve stem 50 extending through the central passage. The lowermost portion of the valve stem 50 is provided with connection structure for establishing operating connection with the uppermost portion of a gate member 52, being disposed for reciprocation between open and closed positions within a valve chamber 54 of the associated wellhead valve. The tee-shaped connection head 56 of the valve stem 50 is received within a tee-shaped connection slot 58 formed at the upper extremity of the gate member 52 for the purpose of establishing driving connection between the valve stem and the gate.

The valve operator mechanism is of the linear hydraulic actuation type and includes a hydraulic cylinder 60 in which is disposed a piston 62 adapted for reciprocal movement therein. The upper extremity of the valve stem 50 is physically connected in immovable relation with the piston 62 in such manner that movement of the piston causes corresponding movement of the valve stem 50 and the gate member 52. A compression spring 64 is interposed between the lower portion of the piston 62 and the upper extremity of the operator base 36 and serves to bias the piston outwardly away from the operator base. This feature allows mechanical actuation of the piston 62, the valve stem 50 and the gate 52 to a preselected safe position, either selectively by operator personnel or automatically in the event of failure of the hydraulic fluid power supply source.

To provide for energization of the hydraulic valve operator, the valve and operator assembly is provided with a hydraulic fluid supply passage system illustrated generally at 66 which includes a fluid passage 68 formed in the valve body and a fluid passage 70 formed in the operator base 36. The passages 68 and 70 are maintained in fluid communication through a connector tube 72 establishing a sealed bridge between the valve body and operator base when the same are disposed in abutting sealed assembly. Hydraulic fluid from the passage 70 is communicated into a fluid passage defined by a tubular conduit member 74, connecting the operator base passage with a fluid passage 76 formed in the end cap 78 of the hydraulic operator. For energization of the hydraulic operator, hydraulic fluid from a source of pressurized hydraulic fluid is conducted through the valve and operator passage structure and is introduced into the hydraulic cylinder 60 outwardly of the piston 62. Introduction of hydraulic fluid into the cylinder in this manner will actuate the piston inwardly toward the valve body 12 thereby compressing the return spring 64 and causing the valve stem 50 and the gate element 52 to be moved to a position aligning a gate port 80 with the appropriate production flow passage 14 of the valve. To close the valve, it is necessary that the hydraulic fluid supply system be controlled in such manner as to allow hydraulic fluid to flow freely out of the cylinder 60 and through the hydraulic fluid system 66. When this occurs, the combined effects of the compression spring 64 and fluid pressure acting on the valve stem through the circular area defined by the valve stem 50, causes the stem and piston construction to be positively urged in a direction away from the valve body, thereby moving the gate member 50 to its closed position and blocking the flow of fluid through the production flow passage 14 of the valve assembly.

For the purpose of supplying hydraulic fluid under pressure from the supply conduits 32 to the hydraulic fluid system 66 of the valve and valve operator assembly, the supply module device 34 is connected to the valve body structure 12 by a fluid connection bolt 82. The module 34 is so constructed that a fluid distribution passage 84 thereof, being one of a number of passages extending therethrough, is disposed in fluid communication with an annular enlargement 86 surrounding the bolt 82. The pressurized hydraulic fluid within the annular enlargement is then communicated into the hydraulic passage 68 of the valve body through a connection passage 88 illustrated in dash lines in FIG. 2. The remaining passages 90, extending through the module 34 merely serve as guides for other hydraulic distribution conduits 32 extending therethrough. These conduits are connected to the hydraulic fluid supply system of other valve and valve operator assemblies of the valve of a wellhead, for example.

The valve operator mechanism is provided with a shroud-actuating nut 92, which is internally threaded and is threadedly received by an externally threaded tubular extension 94 formed integrally with the closure member 78. A retainer member 96 is threadedly received on the shoroud-actuating nut and is locked in nonrotatable therewith by a setscrew or the like. The retainer member 96 cooperates with a flange 98 formed on the shroud actuation nut 92 to retain the nut against linear movement relative to the shroud member 44. Upon rotating the shroud-actuating nut, therefore, linear movement will be induced to the shroud 44 causing locking or unlocking of the segment clamps 42 as desired. A seal carrier member 100 is threadedly received about the upper extremity of the tubular extension 94 and retains an O-ring type sealing member 102 within a groove formed therein for establishment of a dynamic seal with an internal cylindrical surface 104 of the shroud-actuation nut 92.

An override shaft 106 extends through an axial bore 108 formed in the seal carrier member 100 and is provided with external threads 110 at the lower extremity thereof, receiving internal threads 112 forming a threaded aperture through the closure member 78. The override shaft 106 is provided with an intermediate enlargement 114 having an annular groove in which is disposed an O-ring type sealing member or the like for establishment of a seal between the override shaft and an internal cylindrical surface 116 defined on the extension 94.

In the even the hydraulic fluid supply system becomes damaged or otherwise is rendered inoperative, such as due to breakage of a hydraulic line, the compression spring member 64 will automatically force the piston 62 upwardly to effect closure of the valve 22. In the event it subsequently becomes necessary or desirable to remove the gate member 52 to the open position thereof, such movement may be accomplished simply by rotating the override shaft 106 manually with a wrench or handwheel or with suitable power tools. The override shaft when rotated clockwise will move downwardly into abutting contact with the upper portion of the piston member 62. Continued clockwise rotation of the override shaft 106 will force the piston 62, the valve stem 50 and the gate 52 downwardly against the bias of the piston return spring 64. As the override shaft moves downwardly, the O-ring seal 115 will maintain its sealed contact with the cylindrical surface 116 of the tubular extension 94, thereby preventing sea water or any other external medium from entering and contaminating the valve operator mechanism. The gate member 52 may be forced either partially or fully open and may be maintained in this position by the override stem 106. In the event subsequent closing of the valve becomes necessary or desirable, such movement can be accomplished simply by counterclockwise rotation of the override shaft 106, moving the override shaft linearly outward and allowing the compression spring 64 to bias the piston 62, the valve stem 50 and the gate member 52 to the closed position thereof.

With reference now to FIG. 3, a modified embodiment of this invention is illustrated comprising a hydraulic cylinder 120 and a shroud structure 122 constructed essentially identical with the corresponding structures in FIG. 2. A cylinder closure member 124 is provided with a generally tubular extension 126 formed integrally therewith and including external threads 128 cooperating with a rotatable shroud drive nut 129 for controlling linear actuation of the shroud member 122 in the same manner as discussed above regarding FIG. 2. The tubular extension 126 is provided with internal threads 130, which receive external threads 132 formed on an override cylinder 134 to retain the override cylinder in immovable relation with the closure member 124. An override piston 136 is disposed for reciprocation within the override cylinder 134 and includes an override shaft 138 extending through an axial bore 140 of the override cylinder and into the hydraulic chamber of the valve operator. The outer extremity of the override cylinder 134 is provided with internal threads 142 which receive an externally threaded closure member 144. The closure member 144 is maintained in sealed relation with the override cylinder 134 by an O-ring type sealing member 146 retained within an annular groove in the closure member and disposed in sealing contact with the internal cylindrical surface of the override cylinder. The closure member 144 is provided with a transfer passage 148 into which is threadedly received a fluid transfer device 150. The fluid transfer device 150 is provided with a fluid transfer fitting 152 such as a grease fitting, for example, at one extremity thereof. A fluid passage 154 extending through the fluid transfer device 150 is controlled by means of a valve 156 or the like for controlling the flow of pressurized fluid from the fitting 152 to the fluid transfer passage 148. Pressurized fluid such as grease is introduced into the fluid transfer device 150 by means of a grease gun 158 or the like, which is capable of inducing fluid into the override cylinder 134 at extremely high pressures in the range of 10,000 p.s.i., for example.

The override piston 136 and stem 138 are ordinarily maintained in the uppermost position thereof, since hydraulic fluid pressure is communicated from the hydraulic cylinder 120 and acts on the cross-sectional area defined by the piston 136. The override stem 138 is therefore ordinarily maintained out of abutting engagement with the upper portion of the piston 160 of the operator 120 as shown in FIG. 3.

In order to impart movement to the piston 160 against the bias of its return spring, the grease gun-type fluid-pressurizing device is connected to the fitting 152 of the fluid transfer device 150. The control valve 156 is then moved to its open position, thereby communicating fluid pressure from the pressurizing device 158 to the fluid transfer passage 148. As pressurized fluid such as grease, for example, is forced into the override cylinder 134 above the piston 136, the piston and stem 138 will be forced downwardly into contact with the uppermost portion of the piston 160. Further introduction of pressurized fluid into the override cylinder will cause the piston to be forced downwardly thereby moving the valve stem and gate member of the associated valve to the open position thereof.

Closure of the valve mechanism is achieved simply by disconnecting the fluid-pressurizing device 158 from the fitting 152 and opening the control valve 156. When this is accomplished, the return spring of the valve operator will bias the piston 160 upwardly forcing the fluid out of the override cylinder 134 and moving the piston valve stem and gate member to the fully closed position thereof.

In the event it is desired to maintain the piston 160 in any intermediate position, thereof, such may be accomplished simply by closing the control valve 156 at the appropriate piston position and the override stem 138, being hydrostatically locked, will maintain the piston 160 against further movement toward the closed position thereof.

It is evident from the foregoing that we have provided a novel hydraulically energized valve operator mechanism including means to move the valve operator mechanism and the associated gate structure of the valve to a preselected position in the event the primary hydraulic fluid supply system for the operator structure becomes damaged or is otherwise rendered inoperative. We have provided a simple and unique structure for overriding the spring-biased piston structure of the valve operator without involving any necessity for physically connecting the override system with the system with the piston or other operator structure such as is frequently necessary. The operator mechanism may be manually or hydraulically actuated to any position between the fully closed position of the valve and the gate member may be maintained in such position as long as desired. In the event it is desired to provide an externally adjustable intermediate stop, the override mechanism of FIG. 2 may be simply adjusted and maintained in the adjusted position for as long as desired. In the event the hydraulically energized override system of FIG. 3 is utilized, the override may be remotely controlled simply by extending the hydraulic fluid supply conduit from any desired remote location. For example, a subsea valve operator may be controlled from a platform or the like, both by means of a primary fluid supply system and an override system. It is therefore evident that our invention is one well adapted to attain all of the objects hereinabove set forth together with other advantages which will become obvious and inherent from a description of the apparatus itself.

We claim:

1. A valve operator for actuating a gate valve having a reciprocating gate, said valve operator comprising an operator cylinder, means defining a closure at one extremity of said cylinder, a piston movably disposed within said operator cylinder, valve stem means interconnecting said piston and said gate in unitary assembly, fluid means disposed in fluid communication with said operator cylinder and being operative to move said piston linearly in one direction, biasing means acting on said piston and biasing said piston in the other direction in opposition to said fluid means, an override cylinder carried by said closure outwardly of said operator cylinder, an override piston movably disposed within said override cylinder and having an elongated stem adapted for contact with said operator piston, closure means for said override cylinder defining a fluid passage into said override cylinder, valve means for controlling the flow of actuating fluid into said override cylinder, a fitting defining an inlet for said valve means whereby a separate source of actuating fluid may be connected to said valve means through said fitting and actuating fluid may be injected into said override cylinder under control of said valve means thereby causing said override piston to move said elongated stem linearly into said operator cylinder and into abutment with said operator piston and moving said operator piston valve stem and gate in a direction opposing said biasing means, said operator piston valve stem and gate being movable in the opposite direction by said biasing means upon venting said override cylinder under control of said valve means.

2. A valve operator for actuating a gate valve having a reciprocating gate for controlling the flow of fluid therethrough, said valve operator comprising an operator base connected to said valve, an operator cylinder connected to said operator base, means defining a closure at the outer extremity of said cylinder, a piston movably disposed within said cylinder, a valve stem extending through said operator base and connecting said piston and gate in unitary assembly, means communicating a controllable source of pressurized operating fluid to said cylinder for moving said piston valve stem and said gate linearly in one direction, said operator having biasing means for imparting linear movement to said piston-operating stem and piston in the opposite direction, an override cylinder removably fixed to said closure, a piston disposed within said override cylinder and having an elongated stem fixed thereto and extending outwardly of said override cylinder into said operator cylinder, said stem adapted for contact with said operator piston, means closing the outer extremity of said override cylinder and defining fluid passage means, a valve controlling the flow of fluid into said override cylinder, a grease fitting defining an inlet to said valve, whereby grease may be selectively injected into said override cylinder under control of said valve causing said elongated stem to move linearly into abutment with said piston thereby forcing said piston, said operating stem, and said gate in said one direction against the bias of said biasing means, said biasing means moving said piston said operating stem and said gate in said other direction upon venting of grease from said override cylinder under control of said valve.